Patented Aug. 26, 1947

2,426,557

UNITED STATES PATENT OFFICE 2,426,557

POROUS SODIUM FLUORIDE PELLET AND PROCESS FOR MAKING SAME

Kenneth E. Long, South Euclid, and Harold W. Cromer, Cleveland, Ohio, assignors to The Harshaw Chemical Company, Elyria, Ohio, a corporation of Ohio No Drawing. Application September 19, 1944, Serial No. 554,854

5 Claims. (Cl. 23—88)

This invention relates to removal of hydrogen fluoride from non-aqueous fluids inert to sodium fluoride.

The object of the invention, broadly stated, is to provide a superior process for removal of hydrogen fluoride from such fluids, such process involving the use of a novel absorbent body of sodium fluoride. More limited objects of the invention are: to provide a suitable porous body of sodium fluoride capable, under the conditions of the process, of being used repeatedly for absorption of HF from such fluids; to provide a method of making such porous bodies having the indicated characteristics; and to provide a commercially practicable process based upon the use of such porous bodies for removing HF, especially small amounts thereof from such fluids as air, nitrogen, petroleum gases, hydrocarbon liquids, etc. Further and more limited objects of the invention will become apparent as the description proceeds.

*The porous body and process of making it*

We have discovered that a porous body suitable for our purpose can be produced by making a pellet of sodium bifluoride, (NaFHF) and then heating it to decompose the NaFHF to NaF and HF. The HF escapes as a gas leaving a skeleton of NaF which is microporous and highly absorptive with respect to HF under the conditions of the process to be described. Sodium bifluoride in finely divided crystal form, commercial crystal sodium bifluoride screened through a 35 mesh screen to remove all coarse particles or aggregates, and containing a great variety of particle sizes down to and below 100 mesh, is pelleted in a Stokes pelleting machine or any other pelleting machine without the admixture of any lubricant. The pelleting pressure preferably is regulated to give a pellet of apparent density of 1.7 to 1.9, as determined from calculated volume as found by micrometer measurements on single pellets and weights of the same pellets, average values from numerous determinations being used. The pellets may be made in sizes such as ⅛″ D. by ⅛″ long, 5/32″ D. by 5/32″ long, or other suitable size, or in the form of much larger briquettes which would then be crushed to granular form. It is expected that smaller pellets will be commercially preferable.

The pellets of NaFHF are heated to drive off the HF or most of it, thus leaving a porous pellet of NaF. The temperature of heating for removal of HF is preferably from 300° C. to 500° C. It is, of course, possible to employ other temperatures, for example, 100° C. to 600° C., but time and economy considerations indicate the narrower range as the better practice. At whatever temperature is selected and under whatever pressure conditions are found preferable (atmosphere pressure is most practical), the heating is continued until most of the HF is removed, preferably until the apparent density of the pellets is from 75% to 85% of the apparent density of the bifluoride pellets heated. (This would result in sodium fluoride pellets of apparent density from 1.3 to 1.5). Since the absolute density of NaF is given in the handbooks as 2.79, it can be seen that the resulting pellets are quite porous.

*Use of porous NaF bodies for absorption of HF*

It is known that NaF can be used to absorb HF, but to the best of our knowledge, no one has heretofore so controlled the conditions as to make possible the use of a porous body of NaF without damage to such porous body. We have discovered that if the temperature is held above 85° C., the porous NaF bodies above described will not swell or disintegrate whereas below that temperature there is an increasing tendency to swelling, disintegration and even liquefaction when the quantity of HF absorbed is too great. Above 85° C., the absorption of HF ceases before there is any damage to the porous body. In order to insure safe operation, we prefer to pass the fluid from which the HF is to be removed over the pellets at a temperature not lower than 100° C. Control may then be allowed to vary 10 centigrade degrees up or down without danger. Good results may be had at 125° C. but if the temperature goes higher than 125° C., the capacity for absorption diminishes until results are unsatisfactory.

Operating at 100° C., for instance, there may remain more HF than desirable, especially where nearly perfect removal of HF is required. In such cases, we may pass the air, or other fluid from which HF is to be removed, through a series of absorption chambers maintained at 100° C. (and containing the porous bodies of NaF), and then through one or more chambers containing such bodies and maintained at temperatures below 85° C. For example, such chambers may be at any temperature down to minus 80° C. In such case, damage to the pellets is prevented because the amounts of HF to be removed are so small that the amount absorbed by any pellet in a normal run is too small to cause swelling. In other words, the chambers which operate about 85° C. will require reconditioning before the low temperature unit being used to absorb traces of HF have absorbed an amount which could cause damage to the pellets. The number of absorbing units operating above 85° C. is so selected as to produce this result.

When the NaF pellets have absorbed HF to the extent that the absorption rate has become unsatisfactory, they may be regenerated in the same way they were produced, that is, by heating between 100° C. and 600° C., preferably from 300° C. to 500° C. Both in the original production of the pellets and in the regeneration, it is desirable to have a gas sweeping over the pellets to remove the HF as it is evolved. The HF may be recovered from the gas in which it is thus entrained, but its recovery is optional. A satisfactory system of equipment would include a series of heated towers and one or more refrigerated towers, each filled with the pellets. During one portion of the cycle a fluid, for example air, containing HF would be passed through the series of towers, first through the heated towers, then through the final refrigerated tower or towers. During the regeneration phase, preheated air would be passed through the train, heating being continued in the case of the heated towers and refrigeration being discontinued in the case of the refrigerated tower of towers. If the air (or other gas) is preheated sufficiently, the towers need not be heated, and on the other hand, preheating can be eliminated if heating of the towers is increased so that the temperature is held within proper limits as indicated above.

What we claim is:

1. A porous, mechanically strong, sodium fluoride pellet of a size too large to pass through a 35 mesh screen having a mass approximating that of the sodium content plus half of the fluorine content of a compacted, mechanically strong, sodium bifluoride pellet of the same volume.

2. A porous, mechanically strong, sodium fluoride pellet of a size too large to press through a 35 mesh screen having an apparent density from 1.3 to 1.5 grams per cubic centimeter.

3. A process of making a porous body of sodium fluoride suitable for absorbing HF comprising heating a highly compacted, mechanically strong pellet of sodium bifluoride at a temperature high enough and for a time sufficient to drive off from said body of sodium bifluoride a major portion of its HF content thereby leaving a body composed mainly of NaF.

4. A process of making a porous body of sodium fluoride comprising forming a compact pellet of $NaHF_2$ and heating the same in a temperature range from 100° C. to 600° C. until the composition approximates NaF the compacting being such as to produce a body of density from 1.3 to 1.5.

5. A process of making a porous body of sodium fluoride comprising forming a compact pellet of $NaHF_2$ and heating the same in a temperature range from 300° C. to 500° C. until the composition approximates NaF.

KENNETH E. LONG.
HAROLD W. CROMER.

REFERENCES CITED

The following references are of record in the file of this patent:

UNITED STATES PATENTS

| Number | Name | Date |
|---|---|---|
| 2,106,435 | Parkes et al. | Jan. 25, 1938 |
| 1,324,030 | Bowman | Dec. 9, 1919 |

OTHER REFERENCES

"Inorganic and Theoretical Chemistry," by Mellor, vol. II, page 516, Longmans, London (1922).

"Condensed Chemical Dictionary" Chemical Catalog Co., N. Y. (1919) page 430.

"Journal of the Society of Chemical Industry," article by Roper et al., V. 45, pages 109T–110T (Apr. 1926).